(12) United States Patent
Colotte et al.

(10) Patent No.: US 11,621,570 B2
(45) Date of Patent: Apr. 4, 2023

(54) AEROSOL-GENERATING SYSTEMS WITH OVERHEATING PREVENTION

(71) Applicant: Altria Client Services LLC, Richmond, VA (US)

(72) Inventors: Guillaume Colotte, Lausanne (CH); Stephane Bilat, Areuse (CH)

(73) Assignee: Altria Client Services LLC, Richmond, VA (US)

( * ) Notice: Subject to any disclaimer, the term of this patent is extended or adjusted under 35 U.S.C. 154(b) by 603 days.

(21) Appl. No.: 15/956,253

(22) Filed: Apr. 18, 2018

(65) Prior Publication Data
US 2018/0301915 A1 Oct. 18, 2018

Related U.S. Application Data

(63) Continuation of application No. PCT/EP2018/056547, filed on Mar. 15, 2018.

(30) Foreign Application Priority Data

Apr. 18, 2017 (EP) .................................... 17166852

(51) Int. Cl.
| | | |
|---|---|---|
| *H02J 7/00* | (2006.01) | |
| *H05B 1/02* | (2006.01) | |
| *A24F 40/57* | (2020.01) | |
| *A24F 40/51* | (2020.01) | |
| *A24F 40/53* | (2020.01) | |

(Continued)

(52) U.S. Cl.
CPC .......... *H02J 7/00309* (2020.01); *A24F 40/51* (2020.01); *A24F 40/53* (2020.01); *A24F 40/57* (2020.01); *A24F 40/90* (2020.01); *H02J 7/0031* (2013.01); *H05B 1/0244* (2013.01);
(Continued)

(58) Field of Classification Search
CPC ........ H02J 7/0029; H02J 7/0031; H02J 7/007; A24F 40/57
See application file for complete search history.

(56) References Cited

U.S. PATENT DOCUMENTS

2013/0319435 A1* 12/2013 Flick ................... A61M 15/008
131/328
2015/0020831 A1* 1/2015 Weigensberg ........ A24F 47/008
131/329

(Continued)

FOREIGN PATENT DOCUMENTS

CA        2859610 A1    6/2013
WO    WO-2016/079152 A1    5/2016

OTHER PUBLICATIONS

Extended European Search Report for European Patent Application No. 17166852 dated Oct. 20, 2017.

*Primary Examiner* — Kelly M Gambetta
*Assistant Examiner* — Jennifer A Kessie
(74) *Attorney, Agent, or Firm* — Harness, Dickey & Pierce, P.L.C.

(57) ABSTRACT

An aerosol-generating system includes an electric heater, a battery and control circuitry. The electric heater is configured to vaporize an aerosol-forming substance. The battery is configured to power the electric heater. The control circuitry is configured to: prevent charging of the battery in response to detecting that the electric heater is in an operation state; or prevent operation of the electric heater in response to detecting that the battery is in a charging state.

14 Claims, 2 Drawing Sheets

(51) Int. Cl.
  *A24F 40/90* (2020.01)
  *A24F 40/10* (2020.01)

(52) U.S. Cl.
  CPC ........... *A24F 40/10* (2020.01); *H02J 7/00302* (2020.01); *H05B 2203/021* (2013.01)

(56) References Cited

U.S. PATENT DOCUMENTS

2016/0338412 A1    11/2016  Monsees et al.
2017/0181471 A1*   6/2017   Phillips ................. H02J 7/0029
2017/0303597 A1*   10/2017  Tsui ..................... A24F 47/008

* cited by examiner

AEROSOL-GENERATING SYSTEMS WITH OVERHEATING PREVENTION

CROSS-REFERENCE TO RELATED APPLICATIONS

This application is a continuation of, and claims priority to, International Application No. PCT/EP2018/056547, filed on Mar. 15, 2018, and further claims priority under 35 U.S.C. § 119 to European Patent Application No. 17166852, filed on Apr. 18, 2017, the entire contents of each of which are incorporated herein by reference.

BACKGROUND

Field

One or more example embodiments relate to aerosol-generating systems (also referred to as vapor-generating systems, electronic vaping systems, or e-vaping systems) for generating an aerosol (also referred to as a vapor). According to one or more example embodiments, an aerosol-generating system comprises an electric heater for vaporizing (configured to vaporize) an aerosol-generating substance (also referred to as a vapor-generating substance) and a battery for powering (configured to power) the electric heater.

Description of Related Art

In aerosol-generating systems, including so-called e-cigarettes, an aerosol-generating substance such as an e-liquid is vaporized by an electric heater. The electric heater is powered by a battery. The battery can be charged, for example, by means of a Universal Serial Bus (USB) cable and a corresponding USB port in the system. However, a battery may burn or cause a sudden increase of internal pressure due to a high battery temperature. A high battery temperature may also breakdown the internal cells of the battery leading to a short circuit. The temperature of the battery may increase during charging of the battery, because of the heat generated by the electric power transferred to the battery, but also sometimes because of external elements, such as electronic components, close to the battery. In high temperature conditions, more and more heat can be generated by the battery in a "thermal runaway" condition. High temperatures can also occur due to overcharging of the battery (i.e., when more charging current is provided to the battery than the battery is designed for). Overvoltage, overcharge current, overdischarge current, overdischarge voltage, recharging a completely depleted battery, or charging or discharging a battery at too high or too low ambient temperatures may also lead to high temperatures of the battery with a possibility of internal damage to the battery.

An internally damaged battery that is close to the face of an adult vaper, who is puffing, may put the adult vaper in an adverse situation.

SUMMARY

At least one example embodiment provides an aerosol-generating system for generating an aerosol, the aerosol-generating system comprising: an electric heater configured to vaporize an aerosol-forming substance; a battery configured to power the electric heater; and control circuitry configured to prevent charging of the battery in response to detecting that the electric heater is in an operation state.

According to at least some example embodiments, the control circuitry may be further configured to prevent operation of the electric heater in response to detecting that the battery is in a charging state. The battery may be further configured to be charged via a USB cable connected to a USB port of the aerosol-generating system.

The aerosol-generating system may further include a charging sensor connected to the control circuitry, the charging sensor configured to detect that the battery is in the charging state.

The control circuitry may be further configured to detect activation of the electric heater, and prevent operation of the electric heater after detecting the activation of the electric heater, in response to detecting that the battery is in the charging state.

The control circuitry may be further configured to detect activation of the electric heater, and prevent the charging of the battery in response to detecting the activation of the electric heater.

The aerosol-generating system may further include a temperature sensor connected to the control circuitry, the temperature sensor configured to detect that the electric heater is in the operation state.

The aerosol-generating system may further include a current sensor connected to the control circuitry, the current sensor configured detect that the electric heater is in the operation state.

The aerosol-generating system may further include a battery portion including the battery and the control circuitry, and a replaceable cartridge configured to store the aerosol-forming substance. The control circuitry may be further configured to: detect whether the replaceable cartridge is connected to the battery portion, and prevent charging of the battery in response to detecting that the replaceable cartridge is connected to the battery portion.

An aerosol-generating system for generating an aerosol, the aerosol-generating system comprising: an electric heater configured to vaporize an aerosol-forming substrate; a battery configured to power the electric heater; and control circuitry configured to prevent operation of the electric heater in response to detecting that the battery is in a charging state.

According to at least some example embodiments, the battery may be further configured to be charged via a USB cable connected to a USB port of the aerosol-generating system.

The control circuitry may be further configured to detect activation of the electric heater, and prevent charging of the battery in response to detecting the activation of the electric heater.

The control circuitry may be configured to detect activation of the electric heater, and prevent operation of the electric heater after detecting the activation of the electric heater, in response to detecting that the battery is in the charging state.

The aerosol-generating system may further include a charging sensor connected to the control circuitry, the charging sensor configured to detect that the battery is in the charging state.

The aerosol-generating system may further include a battery portion including the battery and the control circuitry, and a replaceable cartridge configured to store the aerosol-forming substance. The control circuitry may be further configured to detect whether the replaceable cartridge is connected to the battery portion, and prevent charging of the battery in response to detecting that the replaceable cartridge is connected to the battery portion.

At least one other example embodiment provides a method for controlling an aerosol-generating system including an electric heater configured to vaporize an aerosol-forming substance, a battery configured to power the electric heater, and control circuitry, the method comprising: detecting whether the electric heater is in an operation state or the battery is in a charging state; and preventing one of charging of the battery or operation of the electric heater based on the detecting.

According to at least some example embodiments, the method may further include: detecting whether a replaceable cartridge is connected to a battery portion of the aerosol-generating system, and preventing charging of the battery in response to detecting that the replaceable cartridge is connected to the battery portion.

The method may further include: detecting activation of the electric heater, and preventing the charging of the battery in response to detecting the activation of the electric heater.

The method may further include: detecting activation of the electric heater, and preventing operation of the electric heater after detecting the activation of the electric heater, in response to detecting that the battery is in the charging state.

The detecting may detect that the battery is in the charging state by detecting whether a USB cable is connected to a USB port of the aerosol-generating system.

BRIEF DESCRIPTION OF THE DRAWINGS

Example embodiments are further described with regard to the following drawings, wherein.

In the figures, the same reference numbers are used for the same or similar elements.

DETAILED DESCRIPTION

Figure 1:
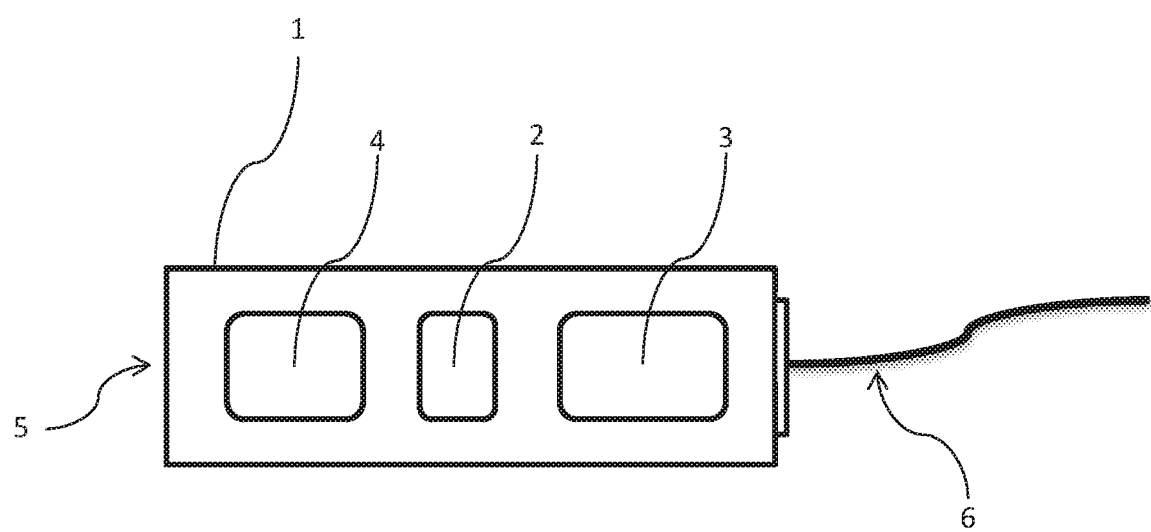
FIG. 1 shows an illustrative sectional view of an example embodiment of an aerosol-generating system with a charging cable.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

One or more example embodiments may be implemented using hardware, a combination of hardware and software, or storage media storing software. Hardware may be implemented using processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

As disclosed herein, the term "storage medium," "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

As discussed herein, the terms "on charge" and "operated" each define a state of the battery with respect to the electric heater. From the initiation of the charging of the battery to the end of the charging of the battery, the battery is in a charging state (i.e., "on charge"). From the initiation (or activation) of heating of the electric heater to the end of the active heating of the electric heater, the electric heater is in an operation state (i.e., "operated").

One or more example embodiments provide aerosol-generating systems (also referred to as vapor-generating systems, electronic vaping systems, or e-vaping systems) configured to suppress and/or prevent an adverse situation for an adult vaper.

At least one example embodiment provides an aerosol-generating system for generating (configured to generate) an aerosol (also referred to as a vapor). The system comprises an electric heater for vaporizing (configured to vaporize) an aerosol-forming substance (also referred to as a vapor-forming substance or a pre-vapor formulation) and a battery for powering (configured to power) the electric heater. The system further comprises a control unit (also referred to as control circuitry and implemented as described above), wherein the control unit is configured to detect if (whether) the electric heater is operated and if (whether) the battery is on charge. The control unit is further configured to prevent charging of the battery, when the electric heater is operated (in response to detecting that the electric heater is in an operation state), and to prevent the electric heater from operating, when the battery is on charge (in response to detecting that the battery is in the charging state).

Providing a control unit which only allows charging the battery or operating the heater in accordance with one or more example embodiments ensures that the adult vaper cannot puff during charging of the battery. Also, the adult vaper cannot charge the battery during puffing. As discussed herein, puffing may also be referred to as application of or applying negative pressure. As described above, the possibility of the battery being internally damaged is highest during charging of the battery due to an increased temperature during the time of charging the battery. Also, puffing may additionally increase the temperature of the battery due to a power transfer from the battery towards the heater and also due to the heater temperature. During charging, this additional heat generation during operating of the heater is prevented by one or more example embodiments. Thus, the possibility of the battery being internally damaged is reduced. Furthermore, if the battery is internally damaged, an uncomfortable situation for an adult vaper can be prevented, since the adult vaper is not puffing during charging.

According to at least one example embodiment, the control unit may detect charging of the battery when a Universal Serial Bus (USB) cable is connected to a USB port of the system. The detection of a connection of a USB cable to a USB port of the system for charging the battery may be facilitated by any conventional means.

Any suitable charging of the battery may be detected by the control unit. For example, a USB type connector may be employed for charging the battery such as a Micro USB or USB type C connector. A customized connector or cable may be employed that interface a USB connector. In this case, a USB cable may be plugged into the customized connector or cable. The other side of the customized connector or cable may connect to the aerosol-generating system. A customized charger may also be employed that is directly connected on one side into a USB port of, for example, an AC adaptor or a PC, and on the other side into the aerosol-generating system with or without cable between charger and system. A customized AC adaptor may also be employed. In this case, a customized AC adaptor with or without a customized cable is employed. The aerosol-generating system may be plugged into the AC adaptor or to the cable connected to the AC adaptor. Any proprietary charging system may be employed. Also, wireless charging such as inductive charging of the battery may be employed and detected by the control unit. For detecting the charging of the battery, a conventional sensor may be employed.

The control unit may detect that a USB cable is connected to the USB port of the system or that the battery is on charge by other means, and, in this instance, prevent the heater from operating. The control unit prevents the heater from heating even if the puff of an adult vaper is detected for as long as the battery is on charge. In this regard, the system may comprise a puff sensor such as an airflow sensor configured to measure the airflow rate, or an on-off button. Also, the puff sensor may be configured as a pressure sensor measuring the pressure of the air inside the system which is drawn through an airflow path of the system by the adult vaper during a puff. Normally, the control unit activates the heater upon detection of a puff of an adult vaper by this sensor. However, if the control unit has detected that the battery is on charge, then the control unit prevents the activation of the heater.

The control unit may be configured to detect if a replaceable cartridge for receiving an aerosol-forming substance is connected. The control unit may further be configured to prevent charging of the battery, when the control unit detects that such a cartridge is present.

The cartridge may be adapted for storing the aerosol-forming substrate to be supplied to the electric heater. The cartridge may be configured as a container or a reservoir for storing liquid aerosol-forming substrate (also referred to as a liquid vapor-forming substrate or a pre-vapor formulation). The cartridge may be capable of being coupled by a respective coupling hermetically sealed against the surrounding atmosphere such as a self-healing pierceable membrane. The cartridge may be configured as a replaceable cartridge such as a tank, container or reservoir. The electric heater may be comprised in the cartridge. In this case, the control unit and the battery are enclosed in a device portion (battery portion) and the replaceable cartridge may be connectable to the device portion. The electric heater may also be encompassed in a housing together with the battery and the control unit such that the replaceable cartridge is connectable to the housing and only comprises the aerosol-forming substrate.

The coupling of such a cartridge may indicate that the adult vaper wants to puff and thus activate the heater. Consequently, the control unit may prevent charging of the battery upon detection that the cartridge is coupled to the device portion or housing.

The control unit may be further configured to detect the initiation of the electric heater, and prevent the charging of the battery when an initiation of the electric heater is detected (in response to detecting initiation of the electric heater).

As described above, a puff may be detected by means of a sensor. The sensor thus detects the initiation of the electric heater. The sensor may be provided as an on-off button, an airflow sensor or a pressure sensor. The electric heater may be initiated by pressing an on-off button for the duration of the adult vaper's puff. Also, the sensor may be provided as an airflow sensor measuring the airflow rate, which is a parameter characterizing the amount of air that is drawn through an airflow path of the system for a time. Depending upon the detected airflow rate, a puff may be detected. In this regard, a puff may be detected, when the airflow exceeds a predetermined (or, alternatively, given or desired) threshold. In case the sensor is provided as a pressure sensor, a pressure difference or a pressure drop between the pressure of ambient air outside of the system and of the air which is drawn through the system by the adult vaper may be measured by the sensor. The pressure of the air may be detected at an air inlet of the system, preferably a semi-open inlet, a mouth end of the system, an aerosol formation chamber or any other passage or chamber within the system, through which the air flows. When the adult vaper draws on the system, a negative pressure or vacuum is created inside the system, wherein the negative pressure may be detected by the pressure sensor.

The control unit may be connected to the sensor to receive the sensor input. When an initiation of the heater is detected by the sensor, the control unit detects whether the battery is at this moment on charge or not. If the battery is on charge, the control unit prevents the operation of the heater. If, however, the control unit detects that the battery is not on charge, the control unit allows an activation of the heater and, at the same time, prevents the charging of the system. For example, if a USB-cable is plugged into a USB-port of the system during a puff of an adult vaper, a charging of the battery is prevented as long as the puff of the adult vaper lasts. Only after the puff of the adult vaper has ended, a charging of the battery is allowed by the control unit. In this case, a further puff of the adult vaper will not result in an activation of the electric heater, since charging of the system is now detected by the control unit and, thus, a subsequent operation of the heater is prevented by the control unit for as long as the battery is on charge.

Alternatively or additionally to a puff sensor as described above, the system may comprise a temperature sensor for detecting the initiation of the electric heater. Also, a current sensor may be employed for detecting the initiation of the electric heater. These sensors may be used to detect that the adult vaper wants to activate the heater. The control unit may only allow the activation of the heater if no charging is detected. If the heater detects that the battery is on charge, an activation of the electric heater is prevented.

A charging sensor may be employed for detecting the charging of the battery. This sensor is connected with the control unit so that the control unit may prevent the electric heater from being activated during charging. Generally, charging is detected by detecting the presence of a voltage on one pin of the aerosol-generating system. To this end, electric components such as a microcontroller or a charger IC may be employed. A BQ24250 2A Single Input I2C/Standalone Switch-Mode Li-Ion Battery Charger from Texas Instruments may be used for this purpose.

All of the above-mentioned sensors may be connected to the control unit so that the output of these sensors may be collected and processed by the control unit. Also, the sensor may be an integral part of the control unit.

The control unit may be part of electric circuitry and may comprise a microprocessor, which may be a programmable microprocessor. The electric circuitry may comprise further electric components. The control unit may be configured to regulate a supply of electric power to the electric heater. Electric power may be supplied to the electric heater continuously following activation of the electric heater or may only be supplied at times, such as on a puff-by-puff basis. The power may be supplied to the electric heater in the form of pulses of electrical current. The control unit may be configured to monitor the electrical resistance of the electric heater, and preferably control the supply of electric power to the electric heater dependent on the electrical resistance of the electric heater.

The battery may have a capacity that allows for the storage of enough energy for one or more puffs of an adult vaper. For example, the battery may have sufficient capacity to allow for a continuous generation of aerosol for a period of around 6 minutes or for a period that is a multiple of 6 minutes. In another example, the battery may have sufficient capacity to allow for a predetermined (or, alternatively, given or desired) number of puffs or discrete activations of the electric heater.

The battery as well as the control unit and also the electric heater may be arranged in a housing of the aerosol-generating system. For allowing ambient air to enter the system, a wall of the housing, such as a wall opposite the electric heater such as a bottom wall, may be provided with at least one semi-open inlet. The semi-open inlet preferably allows air to enter the system, but no air or liquid to leave the system through the semi-open inlet. A semi-open inlet may for example be a semi-permeable membrane, permeable in one direction only for air, but being air- and liquid-tight in the opposite direction. A semi-open inlet may for example also be a one-way valve. For example, the semi-open inlet allows air to pass through the inlet only if specific conditions are met, for example a minimum depression in the system or a volume of air passing through the valve or membrane.

The aerosol-forming substrate for generating an aerosol is a substrate capable of releasing volatile compounds that can form an aerosol. As described above, an aerosol-forming substrate may be contained in a cartridge, such as a replaceable cartridge. The aerosol-forming substrate may also be arranged within the housing of the system in a tank. The tank may be a refillable tank. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material.

The aerosol-forming substrate may comprise at least one aerosol-former (also referred to as a vapor-former). An aerosol-former is any suitable known compound or mixture of compounds that, in use, facilitates formation of a dense and stable aerosol and that is substantially resistant to thermal degradation at the temperature of operation of the system. The liquid aerosol-forming substrate may comprise other additives and ingredients, such as flavourants. The liquid aerosol-forming substrate may comprise water, solvents, ethanol, plant extracts and natural or artificial flavours. The liquid aerosol-forming substrate may comprise nicotine.

The heater may exemplarily be a heated coil, a heated capillary, a heated mesh or a heated metal plate. The heater may exemplarily be a resistive heater which receives electrical power and transforms at least part of the received electrical power into heat energy. The heater may comprise only a single heating element or a plurality of heating elements. The temperature of the heating element or elements is controllable by the control unit.

In one or more example embodiments described above, the heater comprises an electrically resistive material.

One or more example embodiments also provide a method for controlling an aerosol-generating system. The method comprises the step of providing an aerosol-generating system comprising an electric heater for vaporizing an aerosol-generating substance, a battery for powering the electric heater, and a control unit. The method further comprises: detecting, by the control unit, if the electric heater is operated or if the battery is charging; preventing, by the control unit, charging of the battery, when the electric heater is operated; and preventing, by the control unit, the electric heater from operating, when the battery is charging.

One or more example embodiments will be described in the following in more detail referring to the figures.

FIG. 1 shows an illustrative sectional view of an example embodiment of an aerosol-generating system with a charging cable.

Figure 2:
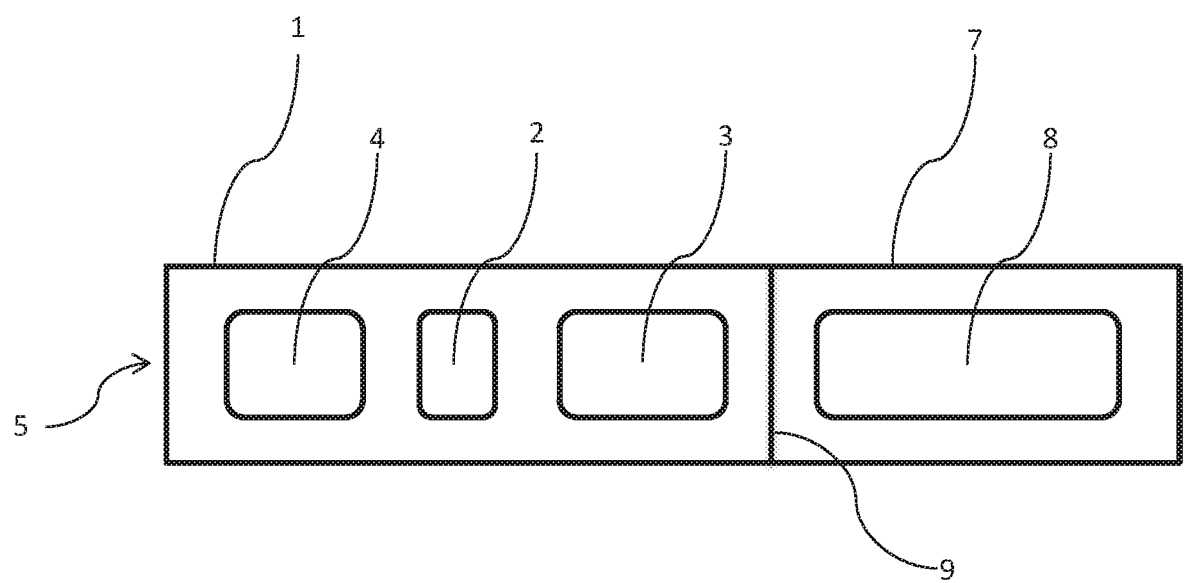
FIG. 2 shows an illustrative sectional view of an example embodiment of an aerosol-generating system with a cartridge.

FIG. 2 shows an illustrative sectional view of an example embodiment of an aerosol-generating system with a cartridge.

In FIG. 1, an aerosol-generating system is depicted. The components of the system are arranged within a housing 1 of the system. These components are a control unit 2 (also referred to as a controller, control circuit or control circuitry), a battery 3, and an electric heater 4. The aerosol-generating system may comprise further components, which are not depicted in FIG. 1.

The battery 3 stores electric power, which may be supplied to the electric heater 4 to heat the electric heater. The supply of the electric power from the battery 3 to the electric heater 4 is controlled by the control unit 2. Thus, the control unit 2 is provided to activate the electric heater 4, in which case the electric heater 4 is heated by means of electric power from the battery 3.

If an adult vaper draws on a mouth end (also referred to as a mouth piece or mouth-end piece) 5 of the system, a sensor such as an airflow sensor (not shown) detects the puff of the adult vaper and the electric heater 4 is activated by means of the control unit 2. However, the control unit 2 only allows the activation of the electric heater 4, when the battery 3 is not on charge.

FIG. 1 shows the system in a state in which a charging cable 6 is connected to the system for charging the battery 3. The charging cable 6 is a USB cable connected to a respective USB port of the system.

Upon detection that the charging cable 6 is connected to the system for charging the battery 3, the control unit 2 prevents an activation of the electric heater 4, even if an adult vaper draws on the mouth end 5.

However, if an adult vaper tries to activate the electric heater 4 by drawing on the mouth end 5 before the charging cable 6 is connected to the system, the subsequent charging of the battery 3 is prevented by the control unit 2 if the charging cable 6 is connected to the USB-port after the activation of the electric heater 4 during a puff of the adult vaper.

FIG. 2 shows an example embodiment in which a cartridge 7 is connected to the system for supplying an aerosol-forming substrate to the system for generating an aerosol (vapor). The cartridge 7 comprises a tank 8 for storing the aerosol-forming substrate. The cartridge 7 may be removably connected to the system by a coupling or coupling means 9. The coupling means 9 may comprise a pierceable membrane. The electric heater 4 may, in at least one other example embodiment, be part of the cartridge 7. In at least this example embodiment, the housing 1 defines a device portion (battery portion) comprising the control unit 2 and the battery 3.

The control unit 2 is configured to detect if a cartridge 7 is coupled to the system. If a cartridge 7 is coupled to the system, then the control unit 2 prevents a charging of the battery 3. A charging of the battery 3 is only enabled by the control unit 2, if the cartridge 7 is not coupled to the system. It is to be noted that FIGS. 1 and 2 show the cartridge 7 and the charging cable 6 both to be connected to the housing 1 of the system at a rearward end. This is only illustrative. The housing 1 may be configured such that the cartridge 7 as well as the charging cable 6 may be attached anywhere at the housing 1 other than at the mouth end 5.

The above described features are to be understood illustrative. The skilled person understands that these features can be combined within the scope of this disclosure.

What is claimed is:

1. An aerosol-generating system for generating an aerosol, the aerosol-generating system comprising:
   an electric heater configured to vaporize an aerosol-forming substance;
   a battery configured to power the electric heater;
   a temperature sensor configured to detect initiation of operation of the electric heater;
   control circuitry connected to the temperature sensor and configured to prevent charging of the battery in response to the temperature sensor detecting that the electric heater is in operation;
   a battery portion including the electric heater, the battery, the temperature sensor, and the control circuitry; and
   a replaceable cartridge configured to store the aerosol-forming substance and to be connected to the battery portion.

2. The aerosol-generating system according to claim 1, wherein the control circuitry is further configured to prevent operation of the electric heater in response to detecting that the battery is in a charging state.

3. The aerosol-generating system according to claim 2, further comprising:
   a charging sensor connected to the control circuitry, the charging sensor configured to detect that the battery is in the charging state.

4. The aerosol-generating system according to claim 2, wherein the control circuitry is configured to
   prevent operation of the electric heater after the initiation of operation of the electric heater, in response to detecting that the battery is in the charging state.

5. The aerosol-generating system according to claim 1, wherein the control circuitry is further configured to
   prevent the charging of the battery in response to the initiation of operation of the electric heater.

6. The aerosol-generating system according to claim 1, wherein the battery is further configured to be charged via a USB cable connected to a USB port of the aerosol-generating system.

7. The aerosol-generating system according to claim 1, further comprising:
   a current sensor connected to the control circuitry, the current sensor configured detect that the electric heater is in operation.

8. The aerosol-generating system according to claim 1, wherein the control circuitry is further configured to
   detect whether the replaceable cartridge is connected to the battery portion, and
   prevent charging of the battery in response to detecting that the replaceable cartridge is connected to the battery portion.

9. An aerosol-generating system for generating an aerosol, the aerosol-generating system comprising:
   a replaceable cartridge including a reservoir containing an aerosol-forming substance;
   an electric heater configured to vaporize the aerosol-forming substance;
   a battery configured to power the electric heater;
   a temperature sensor configured to detect initiation of operation of the electric heater;
   control circuitry connected to the temperature sensor, the control circuitry configured to
      prevent operation of the electric heater in response to detecting that the battery is in a charging state, and
      prevent charging of the battery in response to the temperature sensor detecting that the electric heater is in operation; and
   a battery portion including the electric heater, the battery, the temperature sensor, and the control circuitry, the replaceable cartridge configured to be connected to the battery portion.

10. The aerosol-generating system according to claim 9, wherein the battery is further configured to be charged via a USB cable connected to a USB port of the aerosol-generating system.

11. The aerosol-generating system according to claim 9, wherein the control circuitry is further configured to
    prevent charging of the battery in response to the initiation of operation of the electric heater.

12. The aerosol-generating system according to claim 9, wherein the control circuitry is configured to
    prevent operation of the electric heater after the initiation of operation of the electric heater, in response to detecting that the battery is in the charging state.

13. The aerosol-generating system according to claim 9, further comprising:
    a charging sensor connected to the control circuitry, the charging sensor configured to detect that the battery is in the charging state.

14. The aerosol-generating system according to claim 9, wherein the control circuitry is further configured to
    detect whether the replaceable cartridge is connected to the battery portion, and
    prevent charging of the battery in response to detecting that the replaceable cartridge is connected to the battery portion.

* * * * *